United States Patent
Bashan et al.

(10) Patent No.: US 12,289,311 B2
(45) Date of Patent: Apr. 29, 2025

(54) IN-SERVICE SOFTWARE UPDATE MANAGED BY NETWORK CONTROLLER

(71) Applicant: MELLANOX TECHNOLOGIES, LTD., Yokneam (IL)

(72) Inventors: Ortal Bashan, Tel Aviv (IL); Ayal Lior, Kiryat Ono (IL)

(73) Assignee: Mellanox Technologies, Ltd, Yokneam (IL)

( * ) Notice: Subject to any disclaimer, the term of this patent is extended or adjusted under 35 U.S.C. 154(b) by 0 days.

(21) Appl. No.: 18/474,274

(22) Filed: Sep. 26, 2023

(65) Prior Publication Data
US 2025/0106211 A1 Mar. 27, 2025

(51) Int. Cl.
*G06F 15/16* (2006.01)
*G06F 8/656* (2018.01)
*H04L 9/40* (2022.01)
*H04L 41/40* (2022.01)
*H04L 49/356* (2022.01)

(52) U.S. Cl.
CPC .............. *H04L 63/10* (2013.01); *G06F 8/656* (2018.02); *H04L 41/40* (2022.05); *H04L 49/358* (2013.01)

(58) Field of Classification Search
CPC ....... H04L 63/10; H04L 41/40; H04L 49/358; G06F 8/656
USPC ......................................................... 709/229
See application file for complete search history.

(56) References Cited

U.S. PATENT DOCUMENTS

| | | | |
|---|---|---|---|
| 6,070,012 A | 5/2000 | Eitner et al. | |
| 6,397,385 B1 | 5/2002 | Kravitz | |
| 6,535,924 B1 | 3/2003 | Kwok et al. | |
| 6,640,334 B1 | 10/2003 | Rasmussen | |
| 7,609,617 B2 | 10/2009 | Appanna et al. | |
| 7,661,025 B2 | 2/2010 | Banks et al. | |
| 7,774,438 B2 * | 8/2010 | Zilbershtein | H04L 61/5014 370/230 |
| 8,027,248 B2 * | 9/2011 | Balasubramanian | H04L 41/0836 370/219 |
| 8,068,409 B2 * | 11/2011 | Kumaresan | H04L 45/22 370/216 |
| 8,190,720 B1 | 5/2012 | Yellai et al. | |
| 8,194,642 B2 | 6/2012 | Rosenberg et al. | |
| 8,219,794 B1 | 7/2012 | Wang et al. | |
| 8,346,913 B2 | 1/2013 | Gao et al. | |

(Continued)

FOREIGN PATENT DOCUMENTS

EP 3176723 A1 6/2017

OTHER PUBLICATIONS

U.S. Appl. No. 18/349,147 Office Action dated Feb. 23, 2024.

(Continued)

*Primary Examiner* — Alicia Baturay
(74) *Attorney, Agent, or Firm* — Meitar Patents Ltd.; Daniel Kligler

(57) ABSTRACT

A controller includes one or more ports and a processor. The one or more ports are to communicate with a network that includes multiple network devices. The processor is to receive, from a network device in the network, a request to perform a software update in the network device, to evaluate a permission condition in response to the request, to send to the network device a response granting the request when the permission condition is met, and to at least temporarily deny the request when the permission condition is not met.

23 Claims, 2 Drawing Sheets

(56) References Cited

U.S. PATENT DOCUMENTS

| | | | |
|---|---|---|---|
| 8,364,843 B2* | 1/2013 | Hanselmann | G06F 8/656 |
| | | | 709/229 |
| 8,402,453 B2 | 3/2013 | Gupta et al. | |
| 8,499,060 B2* | 7/2013 | Narayanan | G06F 9/4416 |
| | | | 709/208 |
| 8,570,877 B1* | 10/2013 | Bayar | H04L 41/0681 |
| | | | 370/242 |
| 8,627,137 B1* | 1/2014 | Vaidya | H04L 41/0677 |
| | | | 370/218 |
| 8,705,349 B2* | 4/2014 | Bloch | H04L 47/263 |
| | | | 370/231 |
| 8,745,614 B2 | 6/2014 | Banerjee et al. | |
| 8,782,632 B1 | 7/2014 | Chigurapati et al. | |
| 8,799,422 B1* | 8/2014 | Qu | H04L 49/70 |
| | | | 709/221 |
| 8,943,489 B1* | 1/2015 | Qu | G06F 8/656 |
| | | | 717/172 |
| 9,021,459 B1* | 4/2015 | Qu | G06F 11/1484 |
| | | | 710/33 |
| 9,030,947 B2* | 5/2015 | Xu | H04L 45/563 |
| | | | 370/252 |
| 9,049,148 B1* | 6/2015 | Singh | H04L 45/54 |
| 9,088,584 B2 | 7/2015 | Feng et al. | |
| 9,131,014 B2* | 9/2015 | Kasat | H04L 69/40 |
| 9,177,122 B1 | 11/2015 | Trier | |
| 9,182,972 B2* | 11/2015 | Hanselmann | H04L 45/247 |
| 9,246,702 B1* | 1/2016 | Sharma | H04L 41/5054 |
| 9,455,894 B1* | 9/2016 | Neelam | H04L 43/10 |
| 9,491,107 B1* | 11/2016 | Scudder | H04L 45/28 |
| 9,769,017 B1* | 9/2017 | Jose | H04L 41/0695 |
| 9,846,658 B2* | 12/2017 | Tatar | H04L 49/9005 |
| 9,870,219 B1 | 1/2018 | Manthiramoorthy et al. | |
| 9,935,834 B1* | 4/2018 | Baveja | H04L 41/0846 |
| 10,003,498 B2* | 6/2018 | Shevenell | H04L 41/0895 |
| 10,033,631 B1* | 7/2018 | Baveja | H04L 67/10 |
| 10,079,725 B1* | 9/2018 | Baveja | H04L 41/0895 |
| 10,083,026 B1* | 9/2018 | Venkata | G06F 8/656 |
| 10,084,895 B2* | 9/2018 | Kasat | H04L 69/40 |
| 10,103,995 B1* | 10/2018 | Baveja | H04L 63/101 |
| 10,164,829 B1* | 12/2018 | Watson | H04L 49/252 |
| 10,200,274 B1* | 2/2019 | Suryanarayana | H04L 45/02 |
| 10,284,383 B2 | 5/2019 | Bloch et al. | |
| 10,419,329 B2 | 9/2019 | Levi et al. | |
| 10,452,386 B1 | 10/2019 | Kulchytsky et al. | |
| 10,608,893 B2* | 3/2020 | Di Martino | H04L 41/122 |
| 10,721,333 B2* | 7/2020 | Spear | G16H 10/60 |
| 10,764,140 B2* | 9/2020 | Ozawa | H04L 41/082 |
| 10,824,501 B2 | 11/2020 | Itkin et al. | |
| 10,838,711 B2 | 11/2020 | Haramaty et al. | |
| 10,884,728 B2* | 1/2021 | A | G06F 16/9024 |
| 10,911,508 B2* | 2/2021 | Jones | H04L 67/01 |
| 10,972,402 B1* | 4/2021 | Akash | H04L 47/826 |
| 10,984,107 B2 | 4/2021 | Itkin | |
| 11,012,731 B2* | 5/2021 | Jones | H04L 67/02 |
| 11,082,317 B2* | 8/2021 | Zhang | H04L 41/0659 |
| 11,153,194 B2* | 10/2021 | Roberts | H04L 45/28 |
| 11,252,027 B2 | 2/2022 | Ben-Moshe et al. | |
| 11,321,077 B1 | 5/2022 | Sakthikumar | |
| 11,405,272 B1* | 8/2022 | Khan | H04L 41/0895 |
| 11,489,724 B1* | 11/2022 | Deshmukh | H04L 41/082 |
| 11,570,116 B1* | 1/2023 | Seth | H04L 41/0663 |
| 11,640,291 B2* | 5/2023 | A | H04L 41/0893 |
| | | | 717/172 |
| 11,741,232 B2 | 8/2023 | Sfadia et al. | |
| 11,778,012 B2* | 10/2023 | Jones | H04L 65/613 |
| | | | 709/219 |
| 11,792,069 B2* | 10/2023 | Deshmukh | H04L 41/082 |
| | | | 709/221 |
| 11,900,096 B2* | 2/2024 | Mahishi | G06F 8/65 |
| 11,922,162 B2* | 3/2024 | A | G06F 8/65 |
| 11,962,507 B1* | 4/2024 | Seth | H04L 47/27 |
| 11,973,648 B2* | 4/2024 | Mahishi | H04L 41/0873 |
| 11,979,286 B1* | 5/2024 | Koundinya | H04L 49/70 |
| 12,001,835 B2* | 6/2024 | Rojas Fonseca | G06F 8/656 |
| 12,020,019 B2* | 6/2024 | Rojas Fonseca | G06F 16/219 |
| 2002/0092008 A1 | 7/2002 | Kehne et al. | |
| 2003/0028800 A1 | 2/2003 | Dayan et al. | |
| 2003/0188176 A1 | 10/2003 | Abbondanzio et al. | |
| 2004/0024860 A1 | 2/2004 | Sato et al. | |
| 2004/0042547 A1 | 3/2004 | Coleman | |
| 2004/0083476 A1 | 4/2004 | Zhou et al. | |
| 2004/0131115 A1 | 7/2004 | Burgess et al. | |
| 2005/0021968 A1 | 1/2005 | Zimmer et al. | |
| 2005/0114846 A1 | 5/2005 | Banks et al. | |
| 2005/0114894 A1 | 5/2005 | Hoerl | |
| 2005/0125519 A1 | 6/2005 | Yang et al. | |
| 2006/0233182 A1 | 10/2006 | Appanna et al. | |
| 2007/0174685 A1 | 7/2007 | Banks et al. | |
| 2007/0179957 A1* | 8/2007 | Gibson | G16H 70/40 |
| 2007/0183493 A1 | 8/2007 | Kimpe | |
| 2007/0192610 A1 | 8/2007 | Chun et al. | |
| 2007/0300207 A1 | 12/2007 | Booth et al. | |
| 2008/0126541 A1 | 5/2008 | Rosenberg et al. | |
| 2008/0165952 A1 | 7/2008 | Smith et al. | |
| 2008/0195693 A1 | 8/2008 | Gao et al. | |
| 2009/0063108 A1 | 3/2009 | De Atley et al. | |
| 2009/0089774 A1 | 4/2009 | Lynch et al. | |
| 2009/0199049 A1 | 8/2009 | Yorimitsu | |
| 2010/0058306 A1 | 3/2010 | Liles et al. | |
| 2010/0199272 A1 | 8/2010 | Mahajan et al. | |
| 2012/0072734 A1 | 3/2012 | Wishman et al. | |
| 2012/0072893 A1 | 3/2012 | Gupta et al. | |
| 2012/0166781 A1 | 6/2012 | De Cesare et al. | |
| 2012/0210115 A1 | 8/2012 | Park et al. | |
| 2012/0291021 A1 | 11/2012 | Banerjee et al. | |
| 2013/0024677 A1 | 1/2013 | Smith et al. | |
| 2013/0036298 A1 | 2/2013 | De Atley et al. | |
| 2013/0047031 A1 | 2/2013 | Tabone et al. | |
| 2013/0145359 A1 | 6/2013 | Hanselmann | |
| 2013/0155902 A1 | 6/2013 | Feng et al. | |
| 2013/0219156 A1* | 8/2013 | Sears | H04L 41/0866 |
| | | | 713/1 |
| 2013/0254906 A1 | 9/2013 | Kessler et al. | |
| 2013/0262612 A1 | 10/2013 | Langas et al. | |
| 2014/0047174 A1 | 2/2014 | Sakthikumar et al. | |
| 2014/0189673 A1 | 7/2014 | Stenfort et al. | |
| 2014/0317350 A1 | 10/2014 | Langas et al. | |
| 2015/0058979 A1 | 2/2015 | Peeters et al. | |
| 2016/0266894 A1 | 9/2016 | Panicker et al. | |
| 2017/0063539 A1 | 3/2017 | Balakrishnan et al. | |
| 2017/0147356 A1 | 5/2017 | Kotary et al. | |
| 2017/0161483 A1 | 6/2017 | Li et al. | |
| 2017/0168803 A1 | 6/2017 | Katyar et al. | |
| 2017/0346631 A1 | 11/2017 | De Atley et al. | |
| 2018/0067800 A1 | 3/2018 | Gusev et al. | |
| 2020/0026427 A1 | 1/2020 | Peleg et al. | |
| 2020/0106828 A1 | 4/2020 | Elias et al. | |
| 2020/0257521 A1 | 8/2020 | Jayakumar et al. | |
| 2020/0310784 A1* | 10/2020 | Krishnan | H04L 45/563 |
| 2020/0326925 A1 | 10/2020 | Nachimuthu et al. | |
| 2021/0081365 A1* | 3/2021 | Conley | G06F 16/176 |
| 2021/0211281 A1 | 7/2021 | Park et al. | |
| 2021/0240489 A1 | 8/2021 | Xie et al. | |
| 2022/0156377 A1 | 5/2022 | Xie et al. | |
| 2022/0171649 A1* | 6/2022 | Green | H04L 45/02 |
| 2022/0182433 A1* | 6/2022 | Jones | H04L 65/1059 |
| 2023/0075108 A1* | 3/2023 | Subramaniam | H04L 41/149 |

OTHER PUBLICATIONS

PCI Express® Base Specification, Revision 4.0, Version 0.3, pp. 1-1053, Feb. 19, 2014.

Unified Extensible Firmware Interface (UEFI) Specification, Version 2.7—Errata A, Chapter 31, pp. 1765-1798, Aug. 2017.

Implementation Guidance for FIPS 140-2 and the Cryptographic Module Validation Program, National Institute of Standards and Technology Communications Security Establishment, pp. 1-237, Mar. 28, 2003.

FIPS PUB 140-2—"Security Requirements for Cryptographic Modules", pp. 1-69, May 25, 2001.

PKCS#1—Cryptography Standard, Version 2.2, published by RSA Laboratories, pp. 1-63, Oct. 27, 2012.

(56) References Cited

OTHER PUBLICATIONS

FIPS PUB 180-4—"Secure Hash Standard (SHS)", pp. 1-36, Aug. 2015.
FIPS PUB 198-1—"The Keyed-Hash Message Authentication Code (HMAC)", pp. 1-13, Jul. 2008.
Wikipedia, "Firmware", pp. 1-6, Jul. 23, 2019.
Tremaine et al., "Pinnacle: IBM MXT in a memory controller chip," IEEE Micro, vol. 21, No. 2, pp. 56-68, Mar.-Apr. 2001.
Brocade, "Network OS 7.0.1 for Brocade VDX", Release Notes v4.0, pp. 1-199, Aug. 24, 2016.
Anonimous Authors, "Method of Verifying Dynamic Firmware Update Prior to Promotion," IP.com Electronic Publication, pp. 1-5, Sep. 10, 2013.
Sfadia et al., U.S. Appl. No. 18/349,147, filed Jul. 9, 2023.
U.S. Appl. No. 18/349,147 Office Action dated May 24, 2024.

\* cited by examiner

IN-SERVICE SOFTWARE UPDATE MANAGED BY NETWORK CONTROLLER

FIELD OF THE INVENTION

The present invention relates generally to communication networks, and particularly to methods and systems for updating of network device software.

BACKGROUND OF THE INVENTION

Network devices used in communication networks, such as packet switches and routers, commonly comprise processors or other programmable devices that run software and/or firmware. The software and/or firmware in network devices may, inter alia, control hardware devices such as Field-Programmable Gate Arrays (FPGAs) and Application-Specific Integrated Circuits (ASICs). It is highly desirable to update the software or firmware without having to disrupt the normal operation of the network device, at least in the data plane. A software or firmware update of this sort is referred to as "In-Service Software Update" (ISSU).

SUMMARY OF THE INVENTION

An embodiment that is described herein provides a controller including one or more ports and a processor. The one or more ports are to communicate with a network that includes multiple network devices. The processor is to receive, from a network device in the network, a request to perform a software update in the network device, to evaluate a permission condition in response to the request, to send to the network device a response granting the request when the permission condition is met, and to at least temporarily deny the request when the permission condition is not met.

In some embodiments, the network is a Software-Defined Network (SDN). In an embodiment, the network is an InfiniBand (IB) network, and the controller is a Subnet Manager (SM) in the IB network. In an embodiment, the software update is an In-Service Software Update (ISSU). In some embodiments, the processor is to at least temporarily deny the request by (i) sending to the network device a notification denying the request, or (ii) temporarily refraining from granting the request, thereby deferring granting the request to a later time.

In a disclosed embodiment, in accordance with the permission condition, the processor is to temporarily deny the request when a temporary interruption in the control-plane operation is intolerable, and to grant the request when the temporary interruption in the control-plane operation is tolerable. In another embodiment, in accordance with the permission condition, the processor is to temporarily deny the request upon finding that the network device provides backup to another network device.

In yet another embodiment, in accordance with the permission condition, the processor is to decide whether or not to grant the request based at least on a state of at least one other network device in the network. In still another embodiment, in accordance with the permission condition, the processor is to temporarily deny the request when more than a specified number of other network devices in the network are currently undergoing software updates. In an example embodiment, in accordance with the permission condition, the processor is to temporarily deny the request when a bandwidth degradation, over the network or over a region of the network, exceeds a permitted bandwidth degradation.

There is additionally provided, in accordance with an embodiment that is described herein, a network device including multiple ports to send and receive packets over the SDN, packet processing circuitry to process the packets, and a processor. The processor is to receive an instruction to perform a software update in the network device, to send, in response to the instruction, a request to a controller of the network, requesting permission to perform the software update, and to defer performing the software update until receiving a response from the controller granting the request.

In some embodiments, the processor is to receive the instruction to perform the software update from a Network Management System (NMS) that is separate from the SDN controller.

There is further provided, in accordance with an embodiment that is described herein, a method for software updating. The method includes, in a controller, which controls a network that includes multiple network devices, receiving a request, from a network device in the network, to perform a software update in the network device. A permission condition is evaluated in the controller in response to the request. A response granting the request is sent from the controller to the network device when the permission condition is met. The request is at least temporarily denied when the permission condition is not met.

There is also provided, in accordance with an embodiment that is described herein, a method for software updating. The method includes, in a network device that sends and receives packets over a network and processes the packets, receiving an instruction to perform a software update in the network device. A request is sent to a controller of the network: in response to the instruction, requesting permission to perform the software update. Performing the software update is deferred until receiving a response from the SDN controller granting the request.

The present invention will be more fully understood from the following detailed description of the embodiments thereof, taken together with the drawings in which:

DETAILED DESCRIPTION OF EMBODIMENTS

Overview

Figure 1:
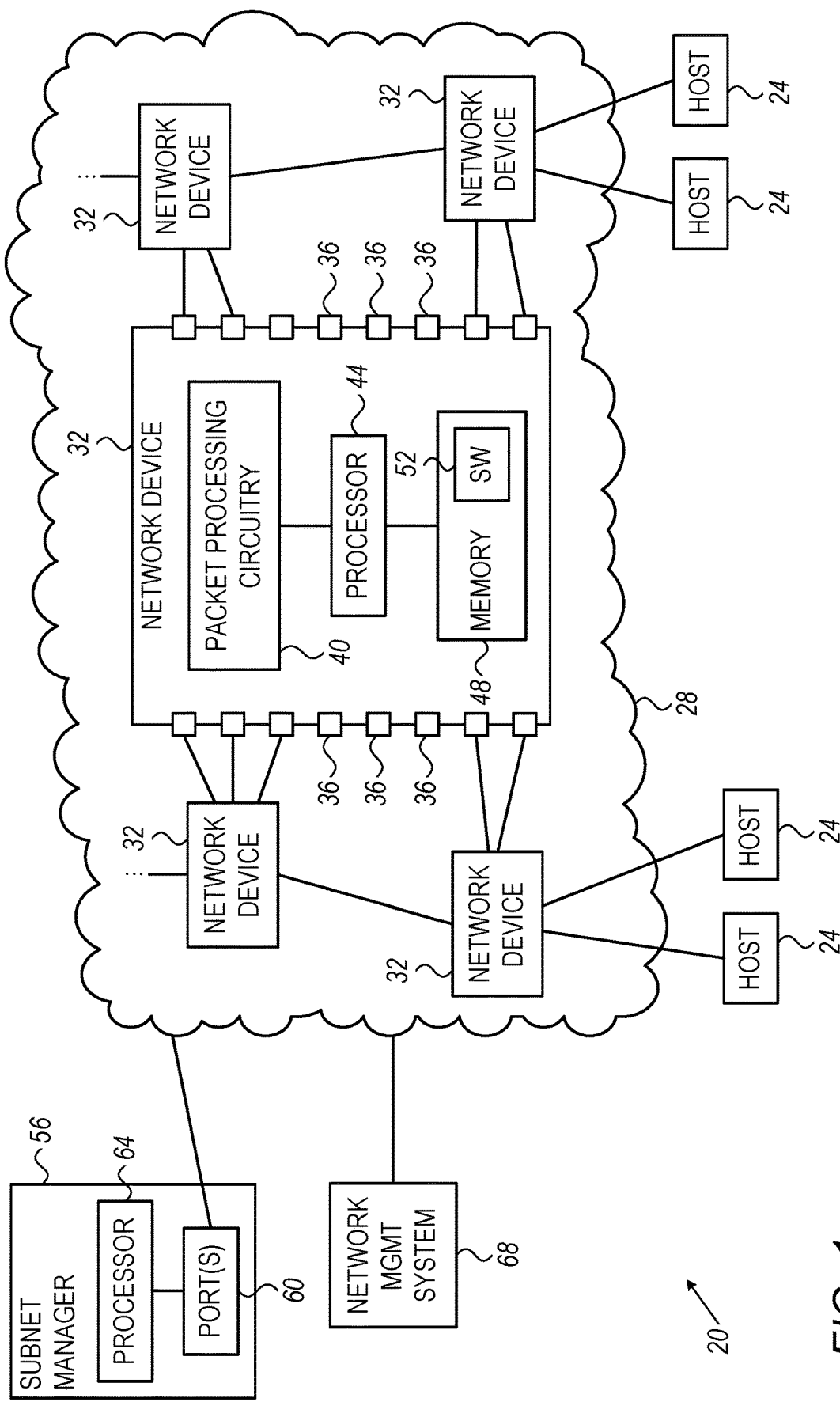
FIG. 1 is a block diagram that schematically illustrates a communication system comprising an InfiniBand (IB) network that employs In-Service Software Updating (ISSU), in accordance with an embodiment of the present invention.

Embodiments of the present invention that are described herein provide improved techniques for performing and controlling software updating in network devices. The embodiments described herein refer mainly to Software-Defined Networks (SDNs), but the disclosed techniques can be used in various other network types. The embodiments described herein refer mainly to In-Service Software Updating (ISSU) in InfiniBand™ (IB) networks, by way of example. The disclosed techniques, however, are also useful for controlling any other type of software update in any other type of network.

In the present context, the term "software" refers to any type of programmable code that runs in a network device, such as software running on a processor or firmware programmed in a programmable logic device. The term "software update", in its various grammatical forms, refers to any type of change in the software, including, example, upgrading or downgrading of software for versions, installation of software patches, and the like. The term "In-Service Software Update" (ISSU) refers to a software update that does not involve resetting the network device or otherwise disrupting the network device's data-plane operations. ISSU typically does allow a temporary disruption of control-plane operations.

A typical SDN is controlled by an SDN controller and managed by a Network Management System (NMS). The operations handled by the SDN controller are referred to as "control-plane" operations, and operations handled by the NMS are referred to as "management-plane" operations. Software updates are conventionally considered management-plane operations and are therefore managed by the NMS.

When using the traditional "division of labor" between the NMS and the SDN controller, the information available to the NMS may not be sufficient for optimally deciding when to update software (and/or when to avoid updating software) in a given network device. Time periods in which software updating is best avoided include, for example, periods in which the network device serves as a backup for another network device, or periods in which multiple other network devices are already undergoing software update. Information of this sort is typically available to the SDN controller. The SDN controller, however, is conventionally not involved in software updating.

In some embodiments that are described herein, both the NMS and the SDN controller participate in deciding when to update software in a given network device. In a disclosed embodiment, upon receiving an instruction from the NMS to perform a software update, the network device does not immediately perform the update as instructed. Instead, the network device sends a request to the SDN controller, requesting permission to perform the software update initiated by the NMS. The SDN controller may grant or deny the request, at least temporarily. Denying the request can be performed by sending an explicit denial notification to the network device, or by refraining from granting the request, thereby effectively deferring the grant to a later time.

In various embodiments, the SDN controller may evaluate various conditions (referred to herein as "permission conditions") for deciding whether and/or when to permit a network device to perform software update. Several non-limiting examples of permission conditions are described herein.

The techniques described herein exploit the information available to the SDN controller to reduce the performance degradation caused by software updates in network devices. At the same time, the disclosed techniques maintain the traditional division of responsibilities between the SDN controller and the NMS, and are therefore simple to implement in existing and emerging SDN protocols.

System Description

FIG. 1 is a block diagram that schematically illustrates a communication system 20, in accordance with an embodiment of the present invention. System 20 comprises multiple hosts 24 that communicate with one another over an IB network 28. Hosts 24 may comprise, for example, servers, personal computers or workstations. System 20 may comprise, for example, a data center, a High-Performance Computing (HPC) cluster, or any other suitable type of system or network.

Network 28 comprises multiple network devices 32, in the present example InfiniBand (IB) switches. As noted above, IB is regarded herein as a non-limiting example of a Software-Defined Network (SDN). In alternative embodiments, network 28 and network devices 32 may operate in accordance with any other suitable SDN protocol, e.g., a protocol defined over Ethernet. Network devices 32 may alternatively comprise routers, bridges, gateways, or any other suitable type of network devices.

A given network device 32 typically comprises multiple ports 36, packet processing circuitry 40, and a memory 48. (The internal structure is depicted in the figure only for one of network devices 32, for the sake of clarity. The other network devices typically have a similar internal structure.) Ports 36 are used for sending and receiving packets to and from network 28. Packet processing circuitry 40 processes the packets, e.g., forwards each incoming packet to a suitable egress port. Processor 44 configures, manages and controls the operation of network device 32.

Memory 48 is used for storing any relevant information used by the network device. Among other data, memory 48 stores software code (SW) 52 of processor 44. Among other tasks, processor 44 updates SW 52 using ISSU techniques that are disclosed herein. More generally, the software being updated may comprise, for example, any software and/or firmware running in network device 32, e.g., in processor 44 and/or processing circuitry 40.

System 20 further comprises an IB Subnet Manager (SM) 56, which controls the operation of network devices 32 and of network 28 in general. As noted above, SM 56 is regarded herein as a non-limiting example of an SDN controller. In the present example, SM 56 comprises one or more ports 60 for communicating with network 28 (e.g., with network devices 32), and a processor 64 that carries out the various computing tasks of SM 56. Among other tasks, processor 64 participates in the disclosed ISSU processes, as will be described in detail below.

System 20 additionally comprises a Network Management System (NMS) 68. NMS 68 is separate from SM 56 and has separate responsibilities and tasks. Among other tasks, NMS 68 initiates ISSU processes in network devices 32, and provides the network devices with the software to be updated. NMS 68 may use any suitable criterion or policy for choosing which network devices to update using ISSU and when. In one non-limiting example, the NMS may identify (e.g., by communicating with other management systems that implement service delivery) a group of network devices, which serve a certain job or customer that is currently idle. The NMS may prefer to perform ISSU in this group of network devices.

The configurations of system 20, including the internal configurations of network devices 32 and SM 56, as shown in FIG. 1, are example configurations that are chosen purely for the sake of conceptual clarity. In alternative embodiments, any other suitable configurations can be used. Elements that are not necessary for understanding the principles of the present invention have been omitted from the figures for clarity.

The various elements of system 20, including network devices 32 and SM 56, may be implemented in hardware, e.g., in one or more Application-Specific Integrated Circuits (ASICs) or FPGAS, in software, or using a combination of hardware and software elements. In some embodiments, processor 44 and/or processor 64 may be implemented, in part or in full, using one or more general-purpose processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

ISSU Controlled by SM

Figure 3:
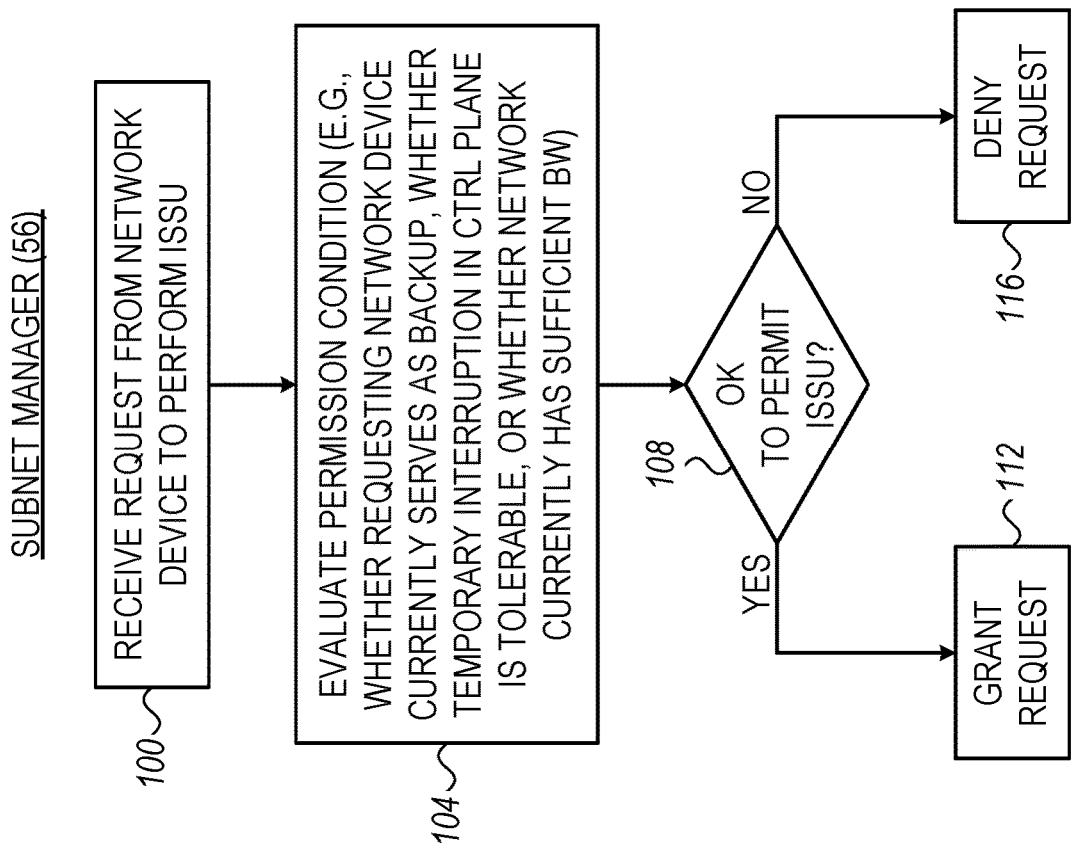
FIG. 3 is a flow chart that schematically illustrates a method for controlling network-device ISSU by a Subnet Manager (SM), in accordance with an embodiment of the present invention.
Figure 2:
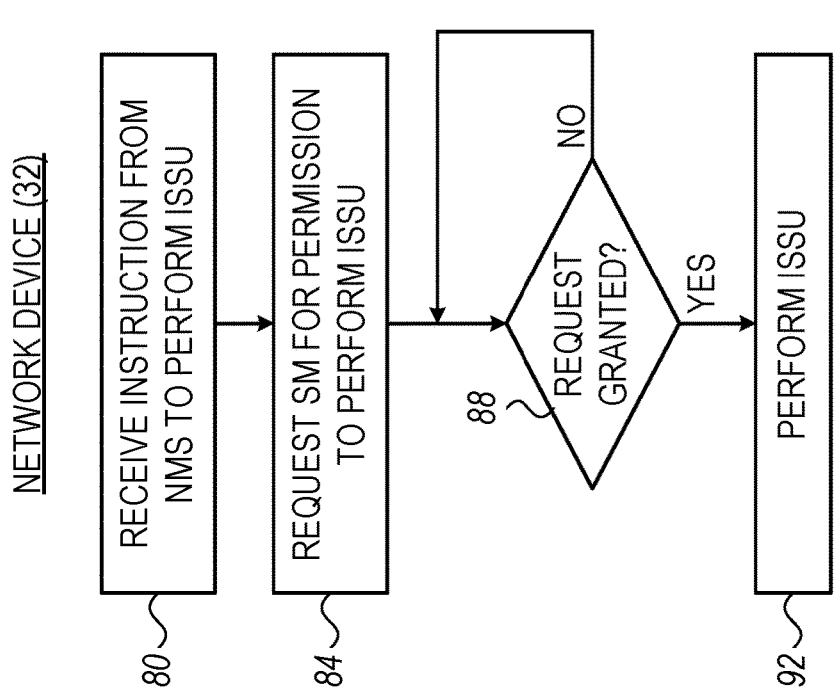
FIG. 2 is a flow chart that schematically illustrates a method for ISSU in a network device, in accordance with an embodiment of the present invention.

FIGS. 2 and 3 below illustrate the disclosed ISSU process, in accordance with an embodiment of the present invention. FIG. 2 depicts the part of the process performed in a network device 32 whose software is to be updated. FIG. 3 depicts the part of the process performed by SM 56.

FIG. 2 is a flow chart that schematically illustrates a method for ISSU in a given network device 32 of system 20, in accordance with an embodiment of the present invention. The method is typically carried out by processor 44 of the network device.

The method begins with processor 44 receiving (e.g., via one of ports 36) an instruction from NMS 68 to perform ISSU, at an instruction reception stage 80. The instruction may be accompanied by the actual updated software version (e.g., version SW 52) to be of installed. Alternatively, the updated software version may be downloaded to network device 32 in advance.

At a requesting stage 84, processor 44 sends (e.g., via one of ports 36) a request to SM 56, requesting permission to perform the ISSU. At a grant checking stage 88, processor 44 checks whether the request is granted or not. Processor 44 does not proceed with the ISSU process until receiving a grant from SM 56. Once the request is granted by SM 56 (e.g., via one of ports 36), processor 44 updates the software as instructed, at an ISSU stage 92.

FIG. 3 is a flow chart that schematically illustrates a method for controlling the network-device ISSU by SM 56, in accordance with an embodiment of the present invention. The method is typically carried out by processor 64 of the network device.

The method begins with processor 64 receiving (via a port 60) a request from a given network device 32 to perform ISSU, at a request reception stage 100. At a permission checking stage 104, processor 64 evaluates a permission condition for deciding whether to permit or (at least temporarily) deny the request.

In various embodiments, processor 64 may evaluate various permission conditions. Some permission conditions may depend only on the state of the requesting network device. Other permission conditions may depend on the states of one or more other network devices 32 in network 28. Several non-limiting examples of permission conditions include the following:

Permission is denied if the requesting network device currently provides backup to another network device 32, and granted otherwise. The backup may be a full backup (i.e., the network device replaces an entire other network device that has failed) or a partial backup (e.g., the network device serves one or more packet flows that have been diverted from a network device that experiences partial failure or congestion).

Permission is granted if a temporary interruption in control-plane operation of the network device is tolerable, and denied otherwise. For example, processor 64 may determine that network conditions are currently good, meaning there is no need to configure the network device in the short term. As another example, processor 64 may determine that the network device is not currently serving any important or critical job. In both cases, processor 64 may decide that the time is suitable for ISSU.

Permission is denied if more than a specified number of other network devices in network 28 are currently undergoing software updates. If the number of network devices undergoing software updates is below the specified number, permission is granted.

Permission is denied if the current degradation in bandwidth, across network 28 or across a given region of the network, is above a specified degradation level. If the degradation is smaller, permission is granted.

Permission is denied if the network device is currently being configured by SM 56.

Permission is temporarily deferred if processor 64 predicts that the permission condition will be met shortly.

Permission is denied if processor 64 is currently in the process of determining how to reconfigure network devices to mitigate a fault. Such a time is typically unsuitable for losing control over a network device.

Permission to perform ISSU in a given network device is denied if a port of a neighboring network device (a neighbor of the given network device) has failed, causing processor 64 to reroute traffic to another neighbor network device. The rerouting involves configuring the given network device, and therefore a temporary disruption in control-plane functionality is not tolerable at this time.

Additionally or alternatively, processor 64 may evaluate any other suitable permission condition.

At a permission checking stage 108, processor 64 checks whether the requested ISSU should be permitted in accordance with the applicable permission condition. If the permission condition indicates that permission is to be granted, processor 64 sends (via a port 60) a grant notification to the requesting network device 32, at a granting stage 112.

If the permission condition indicates that permission is to be denied, processor 64 denies the request, at a denial stage 116. In various embodiments, denial may be explicit of implicit. In an explicit denial, processor 64 sends (via a port 60) a denial notification, informing the requesting network device 32 that ISSU is temporarily on hold. In an implicit denial, processor 64 does not send any response to the requesting network device, thereby forcing the network device to put the ISSU on hold until receiving a grant.

The flows of FIGS. 2 and 3 above are non-limiting example flows that are depicted purely for the sake of clarity. In alternative embodiments, any other suitable flows can be used. For example, when using implicit denial, processor 64 of SM 56 may re-evaluate the permission condition at a later time (e.g., periodically) until the condition is met, and then send a grant notification. As another example, a network device that is denied permission to perform ISSU (explicitly or implicitly) may wait for a certain time-out period and re-issue the request. As yet another example, NMS 68 may evaluate the situation and re-launch the ISSU instructions to a set of network devices at some later stage.

Additional Embodiments and Variations

In some embodiments, a software update needs to be performed across the entire system 20, including SM 56. In these embodiments, the software of SM 56 (e.g., software of processor 64) is updated first, and the software updates are initiated in network devices 32.

In some embodiments, the functionality of SM 56 is hosted on one of network devices 32. To perform ISSU on the hosting network device, SM 56 is typically relocated first (e.g., to another network device, using a suitable SDN high-Availability (HA) process). Only then ISSU is performed in the network device.

Typically, a network device 32 that performs ISSU notifies SM 56 upon beginning and upon completing the ISSU process. SM 56 typically maintains a list of "excluded network devices"-Network devices that are currently undergoing ISSU. The network devices on this such as re-routing, list are excluded from processes construction of multicast trees, traffic optimization operations such as traffic reduction or aggregation, etc. Such operations are addressed, for example, in U.S. Pat. Nos. 10,284,383, 10,419,329 and 11,252,027 and U.S. Patent Application Publication 2020/0106828. After ISSU is completed, SM 56 removes the network device from the "excluded" list. At this point SM 56 may also update the configuration of the network device in question, e.g., update new network device capabilities.

Although the embodiments described herein mainly address software updating in data centers and HPCs, the methods and systems described herein can also be used in other networks, SDNs or otherwise, such as in mobile networks and Virtual Private Networks (VPNs).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms defined in these incorporated documents in a manner that conflicts with the definitions made explicitly or implicitly in the present specification, only the definitions in the present specification should be considered.

The invention claimed is:

1. A controller, comprising:
one or more ports, to communicate with a network that includes multiple network devices; and
a processor, to:
receive, from a network device in the network, a request to perform a software update in the network device, wherein the network device issues the request in response to an instruction from a Network Management System (NMS) that is separate from the controller;
evaluate a permission condition in response to the request; and
send to the network device a response granting the request when the permission condition is met, and at least temporarily deny the request when the permission condition is not met,
wherein the NMS does not maintain information on network devices that serve as a backup for other network devices, and on network devices currently undergoing a software update, while the controller maintains information on network devices that serve as a backup for other network devices, and on network devices currently undergoing a software update.

2. The controller according to claim 1, wherein the network is a Software-Defined Network (SDN).

3. The controller according to claim 1, wherein the network is an InfiniBand (IB) network, and wherein the controller is a Subnet Manager (SM) in the IB network.

4. The controller according to claim 1, wherein the software update is an In-Service Software Update (ISSU).

5. The controller according to claim 1, wherein the processor is to at least temporarily deny the request by (i) sending to the network device a notification denying the request, or (ii) temporarily refraining from granting the request, thereby deferring granting the request to a later time.

6. The controller according to claim 1, wherein, in accordance with the permission condition, the processor is to temporarily deny the request when a temporary interruption in a control-plane operation is intolerable, and to grant the request when the temporary interruption in the control-plane operation is tolerable.

7. The controller according to claim 1, wherein, in accordance with the permission condition, the processor is to temporarily deny the request upon finding that the network device provides backup to another network device.

8. The controller according to claim 1, wherein, in accordance with the permission condition, the processor is to decide whether or not to grant the request based at least on a state of at least one other network device in the network.

9. The controller according to claim 1, wherein, in accordance with the permission condition, the processor is to temporarily deny the request when more than a specified number of other network devices in the network are currently undergoing software updates.

10. The controller according to claim 1, wherein, in accordance with the permission condition, the processor is to temporarily deny the request when a bandwidth degradation, over the network or over a region of the network, exceeds a permitted bandwidth degradation.

11. A network device, comprising:
multiple ports, to send and receive packets over a network;
packet processing circuitry, to process the packets; and
a processor, to:
receive an instruction to perform a software update in the network device, from a Network Management System (NMS) that is separate from the controller;
in response to the instruction, send a request to a controller of the network, requesting permission to perform the software update; and
defer performing the software update until receiving a response from the controller granting the request,
wherein the NMS providing the instruction to perform a software update does not maintain information on network devices that serve as a backup for other network devices, and on network devices currently undergoing a software update, while the controller maintains information on network devices that serve as a backup for other network devices, and on network devices currently undergoing a software update.

12. The network device according to claim 11, wherein the processor is to receive the instruction to perform the software update from a Network Management System (NMS) that is separate from the controller.

13. A method for software updating, comprising:
in a controller, which controls a network that includes multiple network devices, receiving a request, from a network device in the network, to perform a software update in the network device, wherein the network device issues the request in response to an instruction from a Network Management System (NMS) that is separate from the controller;

evaluating in the controller a permission condition in response to the request; and sending from the controller to the network device a response granting the request when the permission condition is met, and at least temporarily denying the request when the permission condition is not met, wherein the NMS does not maintain information on network devices that serve as a backup for other network devices, and on network devices currently undergoing a software update, while the controller maintains information on network devices that serve as a backup for other network devices, and on network devices currently undergoing a software update.

14. The method according to claim 13, wherein the network is a Software-Defined Network (SDN), and wherein the controller is an SDN controller.

15. The method according to claim 13, wherein the network is an InfiniBand (IB) network, and wherein the controller is a Subnet Manager (SM) in the IB network.

16. The method according to claim 13, wherein the software update is an In-Service Software Update (ISSU).

17. The method according to claim 13, wherein at least temporarily denying the request comprises (i) sending to the network device a notification denying the request, or (ii) temporarily refraining from granting the request, thereby deferring granting the request to a later time.

18. The method according to claim 13, wherein evaluating the permission condition comprises temporarily denying the request when a temporary interruption in a control-plane operation is intolerable, and granting the request when the temporary interruption in the control-plane operation is tolerable.

19. The method according to claim 13, wherein evaluating the permission condition comprises temporarily denying the request upon finding that the network device provides backup to another network device.

20. The method according to claim 13, wherein evaluating the permission condition comprises deciding whether or not to grant the request based at least on a state of at least one other network device in the network.

21. The method according to claim 13, wherein evaluating the permission condition comprises temporarily denying the request when more than a specified number of other network devices in the network are currently undergoing software updates.

22. The method according to claim 13, wherein evaluating the permission condition comprises temporarily denying the request when a bandwidth degradation, over the network or over a region of the network, exceeds a permitted bandwidth degradation.

23. A method for software updating, comprising:

in a network device that sends and receives packets over a network and processes the packets, receiving an instruction to perform a software update in the network device;

in response to the instruction, sending a request to a controller of the network, requesting permission to perform the software update; and deferring performing the software update until receiving a response from the controller granting the request, wherein receiving the instruction comprises receiving the instruction from a Network Management System (NMS) that is separate from the controller, and wherein the NMS providing the instruction to perform a software update does not maintain information on network devices that serve as a backup for other network devices, and on network devices currently undergoing a software update, while the controller maintains information on network devices that serve as a backup for other network devices, and on network devices currently undergoing a software update.

* * * * *